US012630399B2

(12) United States Patent
Su et al.

(10) Patent No.: US 12,630,399 B2
(45) Date of Patent: May 19, 2026

(54) JACK ADAPTERS

(71) Applicant: Pro Eagle LLC, Torrance, CA (US)

(72) Inventors: Benson Su, Torrance, CA (US); Molly Katherine Vermeer, Los Angeles, CA (US)

(73) Assignee: Pro Eagle LLC, Torrance, CA (US)

( * ) Notice: Subject to any disclaimer, the term of this patent is extended or adjusted under 35 U.S.C. 154(b) by 266 days.

(21) Appl. No.: 18/296,817

(22) Filed: Apr. 6, 2023

(65) Prior Publication Data

US 2024/0336459 A1 Oct. 10, 2024

(51) Int. Cl.
*B66F 7/28* (2006.01)
*B66F 7/10* (2006.01)

(52) U.S. Cl.
CPC . *B66F 7/28* (2013.01); *B66F 7/10* (2013.01)

(58) Field of Classification Search
CPC ...... B66F 7/28; B66F 7/10; B66F 7/26; B66F 13/00; B66F 3/36; Y10S 254/04
See application file for complete search history.

(56) References Cited

U.S. PATENT DOCUMENTS 2,568,827 A * 9/1951 Schallock ................ B66F 5/00 254/133 R
2,962,262 A * 11/1960 Garver ...................... B66F 5/00 254/134
3,830,470 A 8/1974 Gibson
4,640,495 A * 2/1987 Parsons ..................... B66F 5/04 254/8 B
5,005,812 A * 4/1991 Robertson ................. B66F 3/38 254/133 R
6,168,138 B1 * 1/2001 Dhein ..................... B66F 13/00 254/134
9,701,524 B2 * 7/2017 Walsh ................... B62B 5/0083
2013/0285349 A1 10/2013 Madison
2014/0061555 A1 * 3/2014 Flournoy ................ B66F 13/00 29/401.1
2015/0137052 A1 5/2015 DeKeuster et al.
2019/0169004 A1 * 6/2019 Su ............................ B60C 7/00
2019/0382251 A1 * 12/2019 Maslowski ............... B66F 5/04
2022/0009758 A1 * 1/2022 Moore ...................... B66F 3/26
2024/0101403 A1 * 3/2024 Reese ....................... B66F 5/00

FOREIGN PATENT DOCUMENTS

CN 213738367 U 7/2021

* cited by examiner

*Primary Examiner* — Seahee Hong
(74) *Attorney, Agent, or Firm* — Lynch LLP; Sean Lynch

(57) ABSTRACT

Embodiments of the inventive subject matter are directed to jack adapters that can improve compatibility of, e.g., floor jacks so that those floor jacks can be used with a wide variety of vehicles that have different jack compatibility requirements. A pinch weld adapter is contemplated, along with an adapter configured to lift some Rivian vehicles, and an adapter that is configured to operate with a jack extender to lift some GM vehicles.

5 Claims, 5 Drawing Sheets

FIG. 1
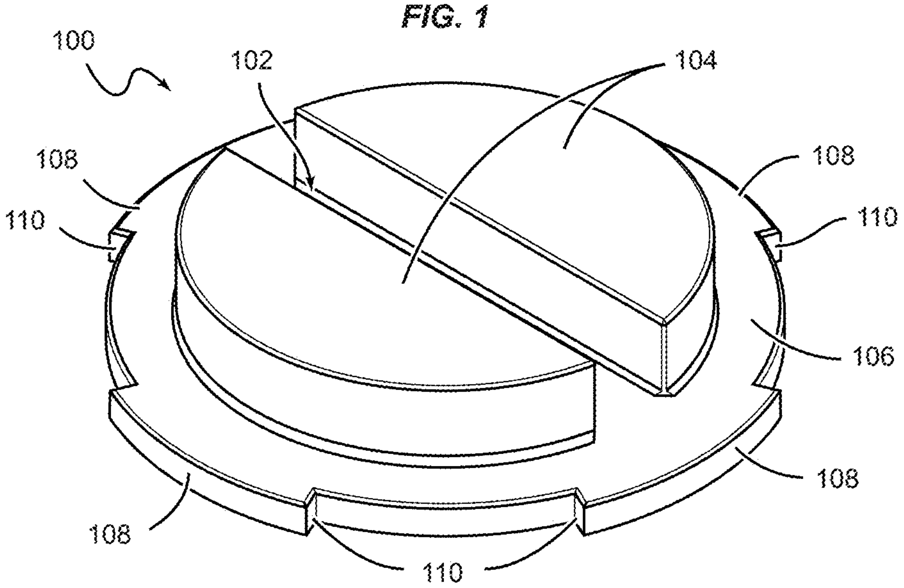
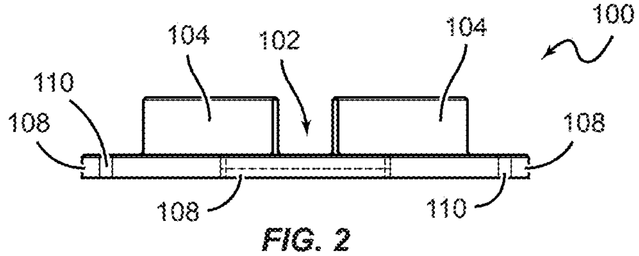
FIG. 2
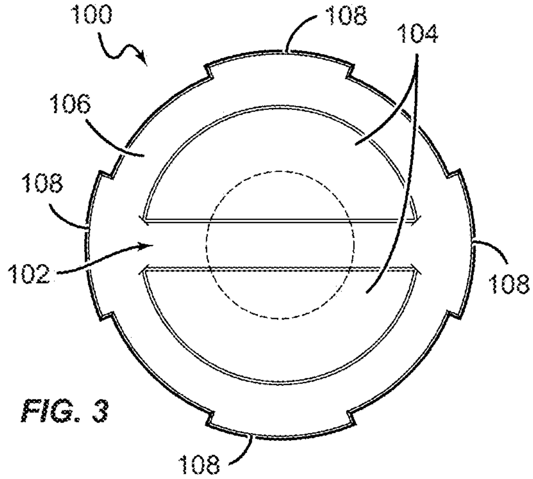
FIG. 3
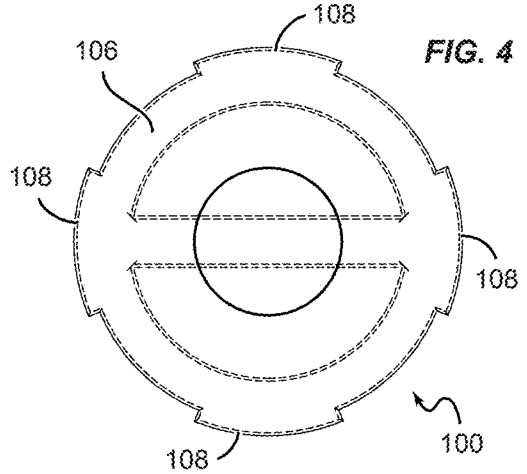
FIG. 4

FIG. 10
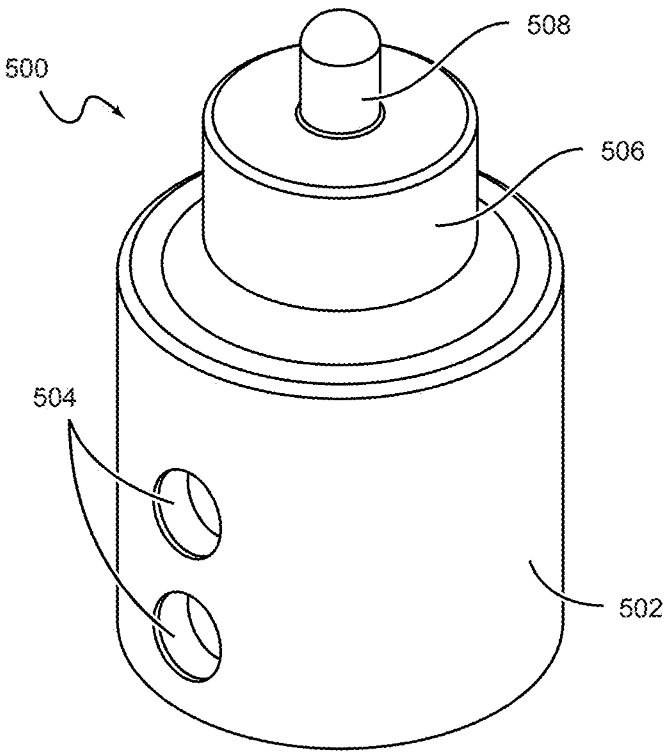
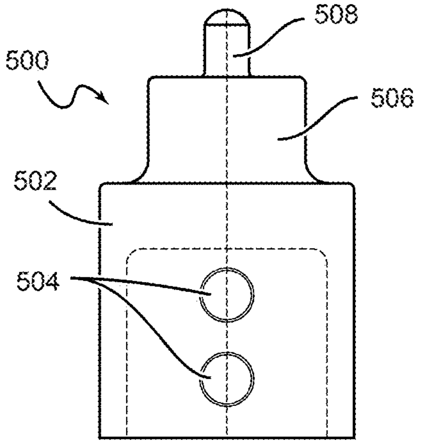
FIG. 11
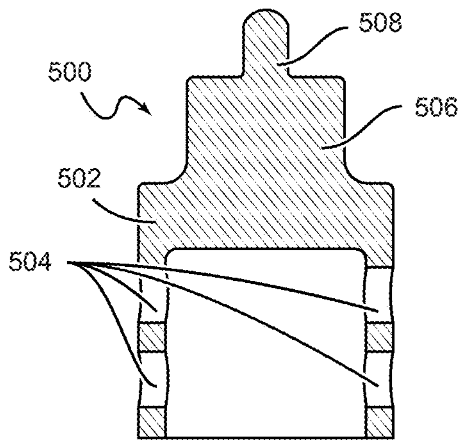
FIG. 12

JACK ADAPTERS

FIELD OF THE INVENTION

The field of the invention is jack adapters for different vehicles.

BACKGROUND

The background description includes information that may be useful in understanding the present invention. It is not an admission that any of the information provided in this application is prior art or relevant to the presently claimed invention, or that any publication specifically or implicitly referenced is prior art.

Floor jacks are used to lift a wide variety of objects, including cars and trucks. Each different vehicle has a different lift point for a jack, and those lift points can be configured differently depending on a variety of factors. For example, there are two broad categories of vehicles: unibody and body on frame. Unibody vehicles are ones in which the frame of the vehicle is integrated into the body, so the rigidity of the vehicle comes from the body of the vehicle. A body on frame vehicle, on the other hand, has a frame onto which the body is attached. The body creates, e.g., the cabin of the vehicle, while the frame forms the rigid undercarriage. These different types of vehicles give rise to different jack points and configurations of the vehicle at those jack points.

One way to solve the issue of different jack point configurations is to have different jacks for each different vehicle. But this solution is expensive because it would require multiple floor jacks performing largely the same task while having different lifting components. This problem can be solved better by having a single floor jack that is compatible with different adapters for different vehicles.

This it has yet to be appreciated that different adapters can be designed to operate with floor jacks to improve the jack's compatibility with a broader variety of vehicles and vehicle types.

SUMMARY OF THE INVENTION

The present invention is directed to apparatuses, systems, and methods as related to jack adapters for use with a variety of different vehicles. In one aspect of the inventive subject matter, a pinch weld adapter comprises: a circular adapter body comprising a flat top surface; where the flat top surface comprises a first semi-circular protrusion and a second semi-circular protrusion; the adapter body comprising four equally spaced tabs extending from its outer edge; and where the first semi-circular protrusion and the second semi-circular protrusion create a linear slot between the two semi-circular protrusions. In some embodiments, the slot is approximately 13 mm wide, and the adapter body has a radius of approximately 47.75 mm. The diameter of the four equally spaced tabs can be approximately 50.75 mm, and the four equally spaced tabs each span an arc of approximately 45 degrees.

In another aspect of the inventive subject matter, a jack adapter comprises: a circular adapter body comprising a flat top surface; the adapter body having four equally spaced tabs extending from its outer edge; a cylindrical body protruding from the flat top surface and having a second flat top surface; an alignment pin protruding from the second flat top surface; and the alignment pin having a rounded top surface. The four equally spaced tabs can each span an arc of approximately 45 degrees. In some embodiments, the adapter body has a radius of approximately 47.75 mm. The diameter of the four equally spaced tabs can be approximately 50.75 mm. The cylindrical body and the circular adapter can have a fillet therebetween. In some embodiments, the cylindrical body and the alignment pin also have a fillet therebetween.

In another aspect of the inventive subject matter, a jack adapter comprises: a cylindrical body comprising a first through-hole and a second through-hole; the cylindrical body having a flat top surface and a concave interior portion; where the first through-hole passes from a first side to a second side of the cylindrical body; where the second through-hole passes from the first side to the second side; where the first through-hole is positioned vertically above the second through-hole on the cylindrical body; a top cylinder protruding from the flat top surface of the cylindrical body, the top cylinder having a second flat top surface; an alignment pin protruding from the second flat top surface; and the alignment pin comprising a rounded top surface.

In some embodiments, the cylindrical body and the top cylinder have a fillet therebetween. The top cylinder and the alignment pin can also have a fillet therebetween. The alignment pin can have a diameter of approximately 11.6 mm, and the concave interior portion can extend approximately 48 mm into the cylindrical body from its bottom surface of the cylindrical body. The concave interior portion can have an internal diameter of approximately 52 mm, and the cylindrical body can have an outer diameter of approximately 66 mm.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1 is a pinch weld adapter for a jack from a front perspective view.

FIG. 2 is the pinch weld adapter from a side view.

FIG. 3 is the pinch weld adapter from a top view.

FIG. 4 is the punch weld adapter from a bottom view.

FIG. 10 is another jack adapter of the inventive subject matter from a front perspective view.

FIG. 11 is the jack adapter from a side view.

FIG. 12 is the jack adapter from a side, cutaway view.

DETAILED DESCRIPTION

Figure 5:
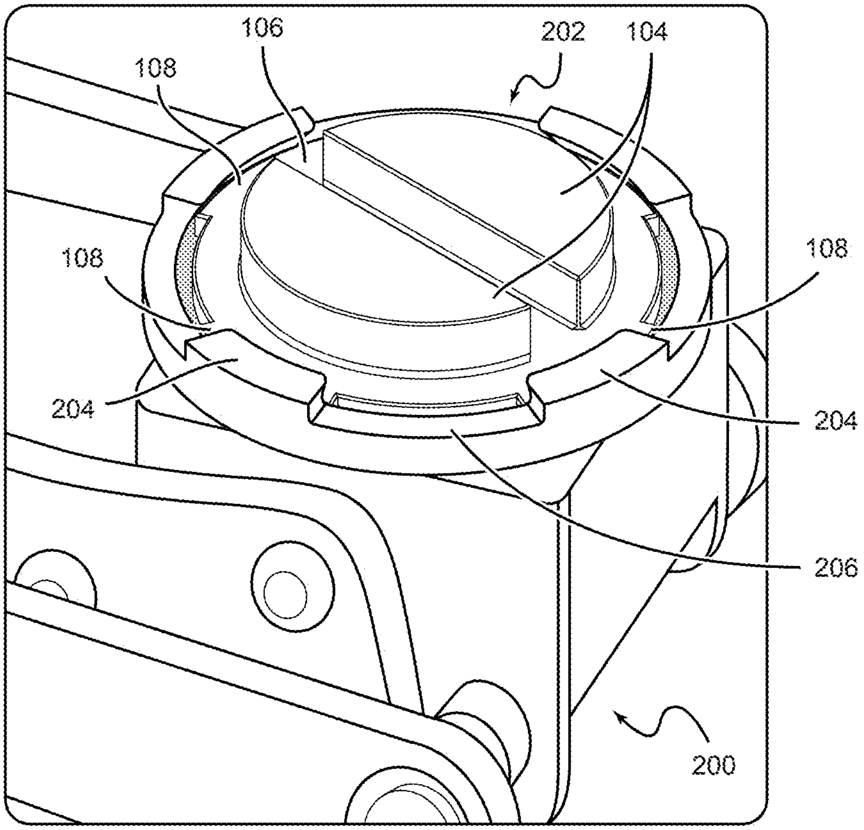
FIG. 5 is the pinch weld adapter in use with the lifting component of a jack.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of “a,” “an,” and “the” includes plural reference unless the context clearly dictates otherwise. Also, as used in the description in this application, the meaning of “in” includes “in” and “on” unless the context clearly dictates otherwise.

Also, as used in this application, and unless the context dictates otherwise, the term “coupled to” is intended to include both direct coupling (in which two elements that are coupled to each other contact each other) and indirect coupling (in which at least one additional element is located between the two elements). Therefore, the terms “coupled to” and “coupled with” are used synonymously.

In some embodiments, the numbers expressing quantities of ingredients, properties such as concentration, reaction conditions, and so forth, used to describe and claim certain embodiments of the invention are to be understood as being modified in some instances by the term “about.” Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

Embodiments of the inventive subject matter are directed to attachments for vehicle jacks. Jacks typically have a lifting component at an end, and that lifting component is made from a metal or composite material that is high in hardness and durability. Attachments described in this application are configured to couple with a jack’s lifting component in a way that secures the attachment to the lifting component.

FIGS. 1-5 show a first jack attachment configured as a pinch weld adapter 100. Pinch weld adapter 100 is configured to work with, e.g., GM vehicles. Pinch weld adapter 100 can be used to lift vehicles that have a narrow, downward facing elongated structural element that is part of—or coupled to—the vehicle’s frame. Pinch weld adapters thus work with most unibody vehicles. Slot 102 is dimensioned to receive the vehicle’s elongated structural element.

FIG. 1 shows pinch weld adapter 100 from a front perspective view. Pinch weld adapter includes two semi-circular protrusions 104 on a top surface of adapter body 106, which together create slot 102. Top surface of adapter body 106 has tabs 108 that extend outward from its edge. Tabs 108 are configured to fit below reciprocal tabs on a jack’s lifting component as shown in FIG. 5. Tabs 108 are configured to span 45 degrees of top surface of adapter body 106, and they are placed at equal distances from each other such that four tabs 108 exist. Spaces without tabs thus also span 45 degrees and exist between each tab. In some embodiments, tabs span less distance than 45 degrees, such as 15-45 degrees. It should be understood that because tabs are defined according to arc angle, arc length thus depends on a radius of the tab. Semi-circular protrusions 104 are axially centered on top surface of adapter body 106, which is circular with the aforementioned tabs protruding from its outer radius. Semi-circular protrusions 104 can have a radius ranging from 30 mm to 50 mm, and in a preferred embodiment approximately 37.25 mm. Semi-circular protrusions 104 can protrude between 5 and 20 mm, preferably approximately 13 mm.

Tabs 108 thus have an outer edge and two protruding edges, each. Protruding edges (e.g., surfaces 110) extend radially outward from the center of top surface of adapter body 106 and each lead to outer edge 118*s*. This feature can improve interlocking between pinch weld adapter 100 and a jack’s lifting component and its reciprocal tabs.

FIG. 2 shows a side view of pinch weld adapter 100. From this view, semi-circular tabs 104 are shown protruding upward from top surface of adapter body 106. Fillets exist between each vertical surface of each semi-circular protrusion 104 and the horizontal surface of top surface of adapter body 106. Shown in dotted lines is an intrusion into bottom surface of adapter body 106. The intrusion can have a depth of, e.g., 2 mm. In some embodiments, semi-circular protrusions 104 are between 7.5 and 20 mm tall, with preferred embodiments having a 13 mm height. Fillets can have a radius of 1 mm.

FIG. 3 shows a top view of pinch weld adapter 100. From the top view, spacing of each of the tabs 108 is easily visible. Because each tab of adapter 100 is formed to span a 45-degree arc, space between tabs is similarly 45 degrees. In embodiments where tabs 108 span less than 45 degrees, space between tabs increases accordingly such that all four tabs 108 remain equally spaced apart. This view shows that semi-circular protrusions 104 are centered around a center point of adapter body 106, and semi-circular protrusions 104 form a circular with a slot cut down a line through the middle. In some embodiments, the slot is approximately 13 mm wide. The slot can range in width from 5 mm to 20 mm. There is technically no upper limit to how wide the slot can be—its width is determined by the width of a structural element that must fit within the slot. In some embodiments, adapter body 106 can have a radius of 47.75 mm, while each tab extending therefrom has a radius of 50.75 mm. This view also shows intrusion into bottom surface of adapter body 106 as a dotted circle.

FIG. 4 shows a bottom view of pinch weld adapter 100. From this view, intrusion into the bottom surface of adapter body 106 is shown in solid lines. In some embodiments, it has a radius of 39 mm, though its radius can range from 10 mm to 50 mm. Intrusion into bottom surface exists because some jacks have a bump on a center portion of the lifting component (e.g., caused by a fastener such as a screw that holds the lifting component to the jack). The indent (and, in some embodiments described below, a hollow portion) allows the jack adapter to sit flat on the lifting component of a jack even if there is some protrusion from a top surface of the lifting component. Adapter body can have a thickness of 5 mm, though it can range from 3 mm to 10 mm, depending on engineering requirements.

FIG. 5 shows pinch weld adapter 100 in place on lifting component 202 of jack 200. Tabs 108 are shown below tabs 204. To put pinch weld adapter 100 into place on the jack’s lifting component 202, pinch weld adapter 100 is placed on jack's lifting component 202 such that tabs 108 are in between tabs 204. Next, pinch weld adapter 100 is rotated until tabs 108 are below tabs 204, which holds pinch weld adapter 100 in place on the jack's lifting component 202. Pinch weld adapter 100 is thus sized and dimensioned to fit onto lifting component 202 of jack 200, and thus the outer radius of each tab 108 must be smaller than an inner radius of lip 206 that lines the lifting component of jack 200 so that the pinch weld adapter 100 can properly fit. Embodiments of pinch weld adapter 100 can be sized and dimensioned according to different lifting component sizes that came come with different sized jacks. Once in place, lip 206 holds pinch weld adapter 100 in place so that it cannot jostle or move out of position relative to lifting component 202—pinch weld adapter 100 is held roughly axially aligned with lifting component 202.

Figure 6:
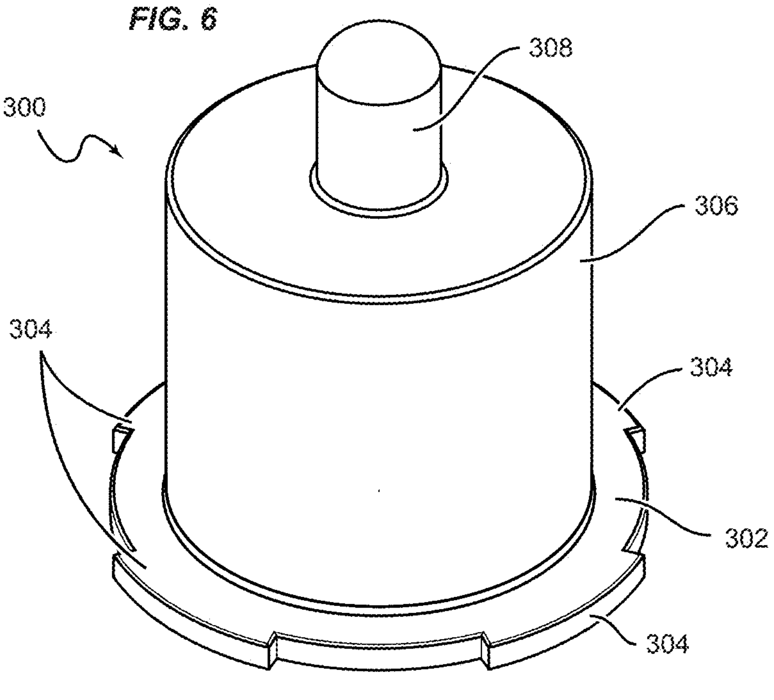
FIG. 6 is a jack adapter from a front perspective view.

FIGS. 6-9 are directed to another embodiment of the inventive subject matter. FIG. 6 shows a jack adapter 300 for use with floor jacks that is designed to work with GM vehicles. Jack adapter 300 features an adapter body 302 having tabs 304. Protruding from a top surface of adapter body 302 is a cylindrical body 306. Cylindrical body 306 has an alignment pin 308 protruding from its top surface. Alignment pin 308 is axially aligned with cylindrical body 306, and cylindrical body 306 is axially aligned with adapter body 302. Adapter body 302 includes tabs 304 identical to those described above regarding the pinch weld adapter. All disclosure related to tabs discussed above applies to this embodiment as well.

Figure 7:
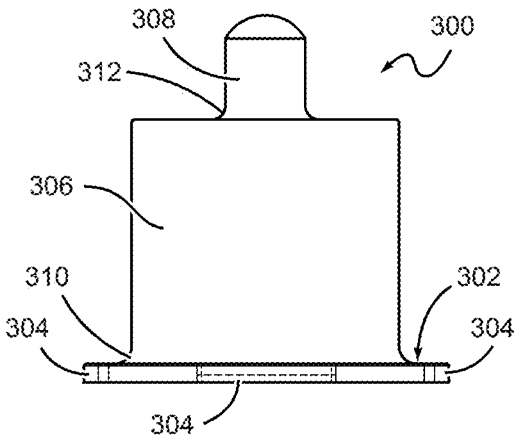
FIG. 7 is the jack adapter from a side view.

FIG. 7 shows a side view of jack adapter 300. As with pinch weld adapter described above, jack adapter 300 includes in intrusion on a bottom surface of adapter body 302. This intrusion is shown in dotted lines and, in some embodiments, can be 2 mm deep. In some embodiments, the vertical surface of cylindrical body 306 and the horizontal surface of adapter body 302 are joined by a fillet 310 having, e.g., a radius of 1 mm. Alignment pin 308 protrudes from a top surface of cylindrical body 306. The vertical surface of alignment pin 308 and the horizonal top surface of cylindrical body 306 can be joined by a fillet 312 having a radius of 1 mm. In some embodiments, alignment pin 308 has rounded top surface, which can make it easier to line up alignment pin with a matching space on the frame or body of a vehicle. Because alignment pin 308 is configured to fit into a portion of a vehicle designed to interact with a jack, an outer diameter of alignment pin 306 is determined by an interior dimension (e.g., diameter or minimum length/width) of the space into which alignment pin 306 must fit. In some embodiments, alignment pin 308 is approximately 29 mm tall with an approximately 22.23 mm diameter, and cylindrical body 306 is approximately 67.6 mm tall with an approximately 74.5 mm diameter. Adapter body 302 is designed the same as adapter body described above regarding the pinch weld adapter, as regardless of the adapter included thereon, the adapter body must be able to function in cooperation with a jack's lifting component.

Figure 8:
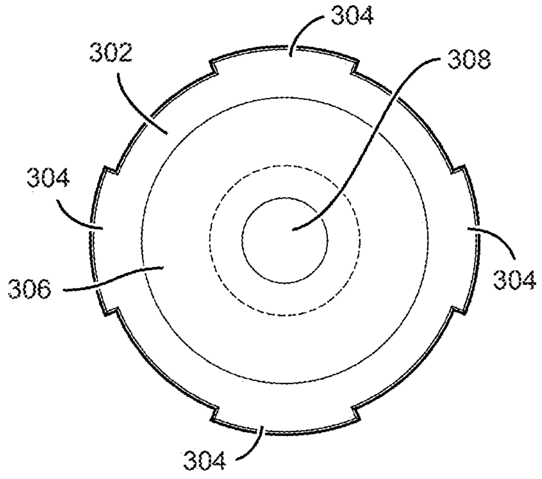
FIG. 8 is the jack adapter from a top view.

FIG. 8 shows a top view of jack adapter 300. This view shows the cross-sectional shapes of both cylindrical body 306 and alignment pin 308, and it also shows that both these component are axially aligned with adapter body 302.

Figure 9:
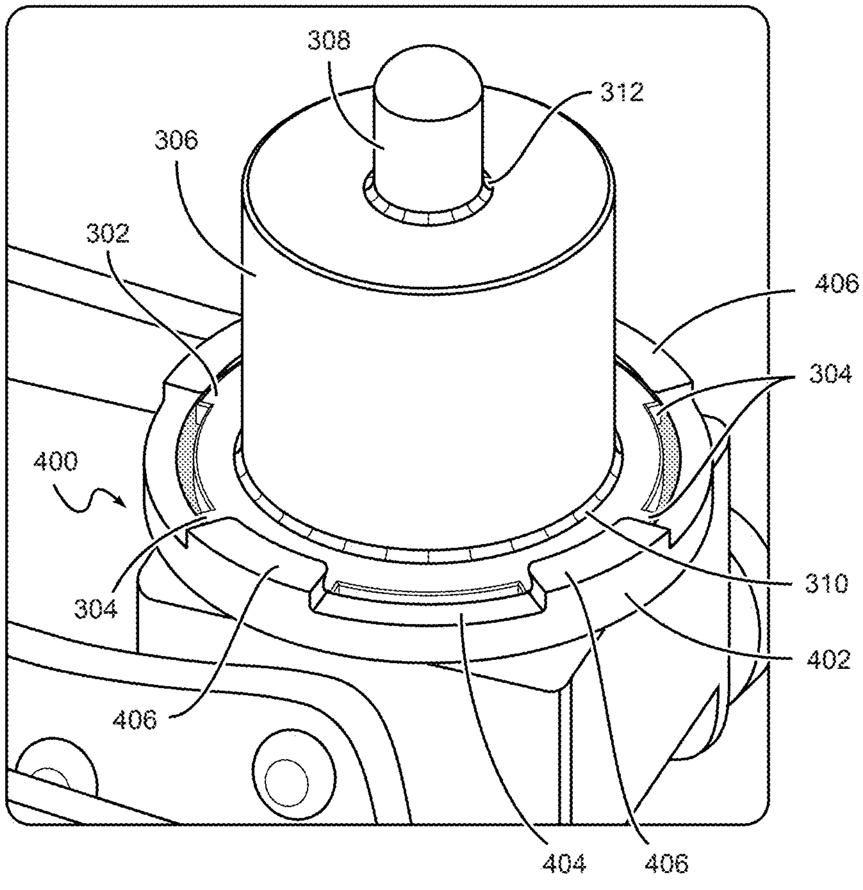
FIG. 9 is the jack adapter in use with the lifting component of a jack.

FIG. 9 shows jack adapter 300 in place on lifting component 402 of jack 400. Similar to the adapter described above, jack adapter 300 fits inside lip 404 of lifting component 402. Jack adapter 300 sets down into lifting component 402 such that tabs 304 fit between tabs 406. Once jack adapter is set down into lifting component 402, it can be rotated so that tabs 304 are below tabs 406. Once in this position, lip 404 holds jack adapter 300 so that it is roughly centered on lifting component 402, and tabs 304 and 406 prevent jack adapter 300 from falling off lifting component 402. Cylindrical components used in jack adapter 300 are formed as cylinders to match jacking points on a variety of vehicles, such as Rivian R1S, Rivian R1T, and the Hummer EV.

FIGS. 10-13 show another jack adapter of the inventive subject matter. As shown in FIG. 10, jack adapter 500 is configured to be used with a jack extender, thus it does not include an adapter body as described above. Instead, jack adapter 500 features a cylindrical body 502 having two through-holes 504. Protruding from a top surface of cylindrical body 502 is top cylinder 506 and protruding from top cylinder 506 is alignment pin 508.

Figure 13:
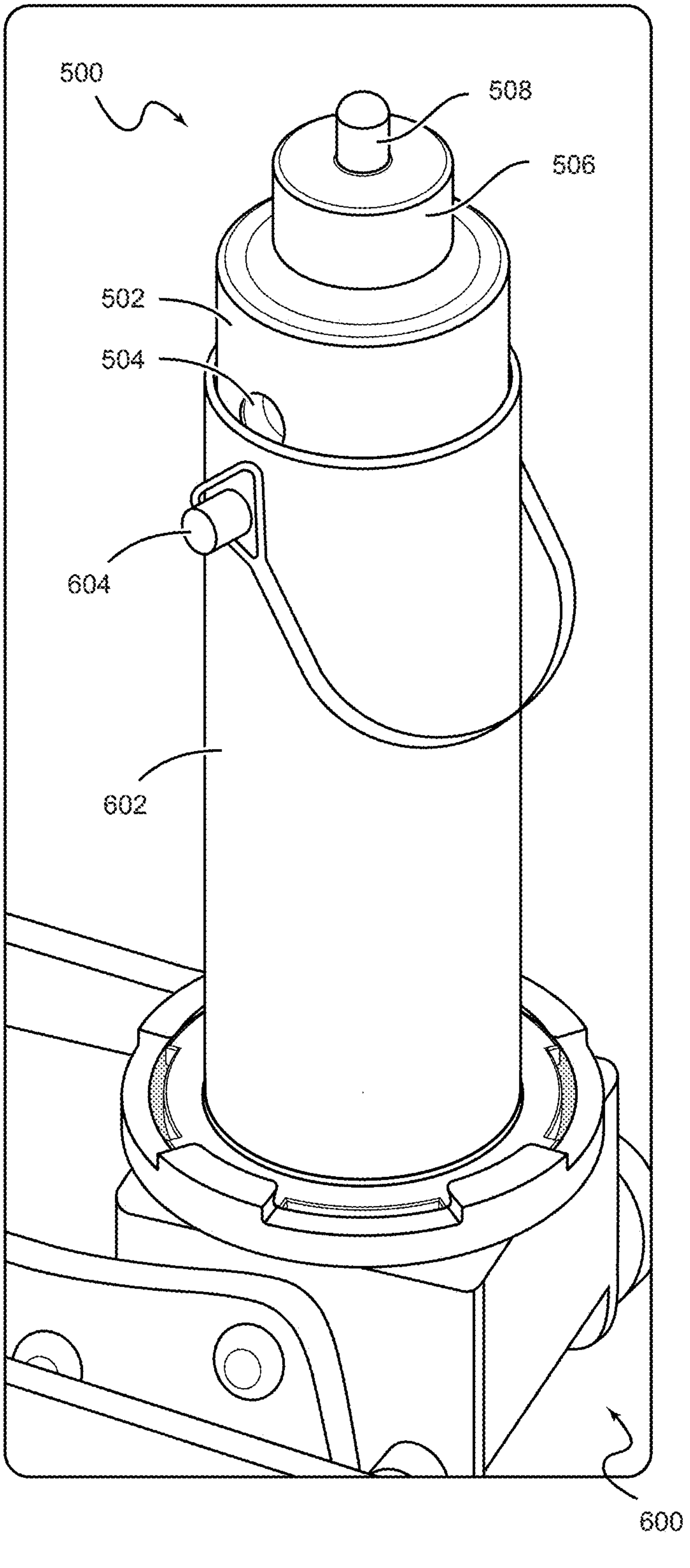
FIG. 13 is the jack adapter in use with the lifting component of a jack that has a lift extender coupled thereto.

FIG. 11 shows a side view of jack adapter 500. From this view, through-holes 504 are shown. A dotted line shows that cylindrical body 502 is mostly hollow, with an opening at its bottom end. This hollow space can reduce overall weight and make drilling through-holes 504 easier without sacrificing durability. The vertical wall of top cylinder 506 mates with a top surface of cylindrical body 502 by fillet, which can have a radius of 6 mm. Through-holes can have a diameter of 13 mm and can have chamfered or rounded edges to ease alignment with pins that are designed to pass through them. The lower through-hole can have its center approximately 14 mm above a bottom surface of cylindrical body 502, and the upper through-hole can have its center approximately 22 mm above that. Through-holes 504 are spaced such that they align with a jack extender as shown in FIG. 13. Alignment pin 508 can have a height of approximately 17.5 mm (including its rounded top) and a diameter of 5-15 mm (e.g., approximately 11.6 mm in a preferred embodiment). Top cylinder 506 can have a height of approximately 27.5 mm and a diameter of approximately 41 mm. Cylindrical body 502 can have a height of approximately 65 mm and a diameter of approximately 66 mm. Cylindrical components used in jack adapter 500 are formed as cylinders to match jacking points on a variety of GM vehicles, such as the Hummer EV pickup truck and the Hummer EV SUV, as well as with the Rivian R1S and R1T.

FIG. 12 is a cutaway view of jack adapter 500. This view shows how though-holes 504 pass through cylindrical body 502. The hollow portion of cylindrical body is also shown, and it can have a diameter of 52 mm and a depth of 48 mm. An upper surface of the hollow portion and the walls of hollow portion can be joined by fillet having a radius of 3 mm.

FIG. 13 shows jack adapter 500 disposed in a jack extender 602 that is attached to a jack 600. Jack extender 602 attaches to a lifting surface of jack 600 in the same way described above regarding jack adapters. Jack extender 602 comprises a through-hole with a removable pin 604. To attach jack adapter 500 to jack extender 602, pin 604 is removed and through-holes 504 are lined up with the through-hole of jack extender 602. Once aligned, pin 604 is placed through the jack extender and through the top of bottom through-holes. This secures jack adapter 500 in place relative to jack extender 602, and jack adapter 500 can thus be used with jack 600 to lift a portion of a compatible vehicle.

Thus, specific jack adapters have been disclosed. It should be apparent to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A jack adapter comprising:

a cylindrical body comprising a first through-hole and a second through-hole;

the cylindrical body having a flat top surface and a concave interior portion;

wherein the first through-hole passes from a first side to a second side of the cylindrical body;

wherein the second through-hole passes from the first side to the second side;

wherein the first through-hole is positioned vertically above the second through-hole on the cylindrical body;

a top cylinder protruding from the flat top surface of the cylindrical body, the top cylinder having a second flat top surface;

wherein the cylindrical body and the top cylinder have a fillet therebetween;

an alignment pin protruding from the second flat top surface; and the alignment pin comprising a dome-shaped rounded top surface.

2. The jack adapter of claim 1, wherein the top cylinder and the alignment pin have a fillet therebetween.

3. The jack adapter of claim 1, wherein the alignment pin has a diameter of approximately 11.6 mm.

4. The jack adapter of claim 1, wherein the concave interior portion extends approximately 48 mm into the cylindrical body from a bottom surface of the cylindrical body.

5. The jack adapter of claim 1, wherein the concave interior portion has an internal diameter of approximately 52 mm and wherein the cylindrical body has an outer diameter of approximately 66 mm.

* * * * *